United States Patent [19]

Ryoke et al.

[11] Patent Number: 4,686,139
[45] Date of Patent: Aug. 11, 1987

[54] MAGNETIC RECORDING MEDIUM

[75] Inventors: Katsumi Ryoke; Nobutaka Yamaguchi; Masatoshi Takahashi; Kazuko Hanai; Hideaki Kosha; Eiichi Tadokoro, all of Kanagawa, Japan

[73] Assignee: Fuji Photo Film Co., Ltd., Kanagawa, Japan

[21] Appl. No.: 778,468

[22] Filed: Sep. 20, 1985

[30] Foreign Application Priority Data

Sep. 20, 1984 [JP] Japan ................... 59-195688

[51] Int. Cl.$^4$ .................... G11B 5/68; G11B 5/708
[52] U.S. Cl. ...................... 428/323; 428/336; 428/408; 428/694; 428/900; 427/131
[58] Field of Search ............. 428/694, 900, 408, 323, 428/336; 427/131; 360/131, 134

[56] References Cited

U.S. PATENT DOCUMENTS 4,439,486  3/1984  Yamada et al. .................. 428/694
4,525,424  6/1985  Bradshaw ........................ 428/694
4,544,601  10/1985 Yamaguchi et al. .............. 428/694

Primary Examiner—Paul J. Thibodeau
Attorney, Agent, or Firm—Sughrue, Mion, Zinn, Macpeak & Seas

[57] ABSTRACT

A magnetic recording medium is described, comprising a non-magnetic support having a magnetic layer and a backing layer which is provided on the surface of the support opposite to the magnetic layer, the backing layer containing (a) non-magnetic particles comprising carbon black having an average particle diameter of 0.1 to 1.0 μm, (b) a binder comprising (i) a resin having 150 kg/cm$^2$ or less of 100% modulus in an amount of at least 50 wt % based on the total amount of binder, and (ii) a diphenyl methane diisocyanate type hardening agent, with the amount of non-magnetic particles to total contained in the backing layer being 40 to 300 parts by weight of non-magnetic particles per 100 parts by weight of binder.

8 Claims, No Drawings

MAGNETIC RECORDING MEDIUM

FIELD OF THE INVENTION

The present invention relates to a magnetic recording medium, and more particularly it relates to a magnetic recording medium having a highly sensitive magnetic recording layer (hereinafter, referred to as a "magnetic layer") and a backing layer which is provided on the surface of the support opposite to the magnetic layer in order to make the magnetic layer more sensitive.

BACKGROUND OF THE INVENTION

Recently, there have been requirements to make a more sensitive magnetic recording medium. If the magnetic recording medium is made more highly sensitive, a high image quality as well as a good sound quality and high density recording can be realized. These improvements can be attained by improving the recording system of a deck used for magnetic recording and reproducing system of a magnetic recording medium and also by improving the magnetic recording medium.

A magnetic recording medium can be highly sensitized by increasing the signal and decreasing the noise in the signal/noise ratio. The signal can be increased by increasing the residual magnetic flux density and coercive force of the magnetic recording media, which can be realized by making the ferromagnetic particles finer or adjusting the shape of anisotropy and the arrangement of the single magnetic domain of each ferromagnetic fine particles.

The noise can be decreased by various factors, for example, by smoothing a magnetic layer and controlling the electrification properties of magnetic recording media. Japanese Patent Publication (examined) No. 3927/75, Japanese Patent Application (OPI) Nos. 111828/82 and 96505/77 (the term "OPI" as used herein refers to "published unexamined Japanese patent application) and U.S. Pat. No. 4,135,031 discloses that a backing layer can be provided in order to control the electrification properties of a magnetic recording medium and to maintain running durability thereof.

However, it is impossible to obtain a satisfactory magnetic recording medium having high sensitivity and sufficient running durability by the above described technology. There are a number of reasons why it has not been possible to obtain such satisfactory magnetic recording medium: thus (1) although spacing loss between a magnetic recording and reproducing head, and a magnetic recording medium can be reduced by smoothing a surface of the magnetic recording medium, running durability deteriorates and friction coefficient increases, whereby the magnetic layer is peeled apart; (2) if a surface of a backing layer is made coarse to improve running durability thereof, the surface roughness of the backing layer is transferred to the magnetic layer. Thereby, RF output (Radio Frequency output) or the signal/noise ratio of the magnetic layer is decreased; (3) at an initial stage of running of a magnetic recording medium that the magnetic layer and the backing layer are not yet peeled apart, drop out (the term "drop out" herein means such level changes that recording skips instantaneously by dust and powders (hereinafter, referred to as "scraped powders") which come off from a magnetic layer upon running) increases, thereby decreasing the signal/noise ratio; and (4) when a calender forming method is conducted to obtain a smooth surface of a magnetic layer and to obtain a highly sensitive magnetic recording, as disclosed, for example, in U.S. Pat. No. 3,916,039, the backing layer readily is peeled apart, and therefore, it is difficult to manufacture a magnetic recording medium having such a smooth surface on the magnetic layer.

SUMMARY OF THE INVENTION

As a result of various investigations, the inventors of the present invention have found that drop out occurring at an initial stage and after repeated run, is caused by dust and scraped powders which stays on the magnetic recording medium. In many cases, adhesion of dust is influenced by the arrangement and the insulating or non-insulating properties, of the running guide of magnetic tapes on a deck for magnetic recording and reproducing and the running speed of the magnetic tape. Particularly in a magnetic recording medium, adhesion of dust is influenced by the hardness of a coated layer, the electrification properties and surface electric resistance thereof. Electrification properties include not only properties of surface electric resistance of the magnetic recording medium but also those of Tribo-electric potential of the medium. Therefore, particles and binder resin should carefully be selected in light of the above properties. They should also carefully be selected considering that a backing layer peels apart in calendering process. Further, the surroundings where a magnetic recording medium runs are important, because they have a close and complicated relation with the electrification properties of dust and the temperature and humidity have an effect on the electrification properties thereof. Considering the frictional properties, the inventors of the present invention have found a satisfactory backing layer, which the signal/noise ratio of the magnetic layer does not decrease, although the surface roughness of the backing layer is transferred to the magnetic layer.

A first object of the present invention is to provide a magnetic recording medium having reduced drop out and a better signal/noise ratio by providing a novel backing layer and by controlling Tribo-electric series thereof.

A second object of the present invention is to provide a magnetic recording medium comprising a tough backing layer and having good running properties.

A third object of the present invention is to provide a highly sensitive magnetic recording medium comprising a backing layer, having a surface roughness which does not affect the signal/noise ratio of the magnetic layer.

The inventors of the present invention have made studies with the aim of removing the defects of the prior art and have found that the above objects of the invention can be accomplished by the following invention.

That is, the present invention relates to a magnetic recording medium comprising a non-magnetic support having a magnetic layer and a backing layer which is provided on the surface of the support opposite to the magnetic layer, the backing layer containing (a) non-magnetic particles comprising carbon black having an average particle diameter of 0.1 to 1 $\mu$m and (b) a binder comprising (i) a resin having a modulus of electricity of 150 kg/cm$^2$ or less in an amount of at least 50 wt% based on the total amount of binder and (ii) a diphenyl methane diisocyanate type hardening agent, with the amount of non-magnetic particles to total binder contained in the backing layer being 40 to 300 parts by weight of non-magnetic particles per 100 parts by weight of binder.

DETAILED DESCRIPTION OF THE INVENTION

The present invention is illustrated in more detail.

Finely ferromagnetic particles which can be used in the magnetic layer of the present invention include those ferromagnetic particles having a specific surface area (B.E.T. Method) measured by the nitrogen adsorption method of 25 m$^2$/g or more, preferably 30 m$^2$/g or more, such as γ-Fe$_2$O$_3$, Co-containing γ-Fe$_2$O$_3$, Fe$_3$O$_4$, Co-containing Fe$_3$O$_4$, CrO$_2$, Co-Ni-P alloy and Co-Ni-Fe alloy.

Specific examples are disclosed in Japanase Patent Publication Nos. 14090/69, 18372/70, 22062/72, 22513/72, 28466/71, 38755/71, 4286/72, 12422/72, 17284/72, 18509/72 and 18573/72.

Further, ferromagnetic particles, powders, additives, supports and a method for preparing a magnetic recording medium are disclosed in U.S. Pat. No. 4,135,016.

The backing layer of the present invention contains non-magnetic particles, and especially contains non-magnetic carbon black particles which are of a special type.

As carbon black used in the backing layer of the present invention includes M.T. (Medium Thermal), F.T. (Fine Thermal) and furnace carbon corresponding to M.T. or F.T., as classified in the carbon black industry. These carbon blacks are commercially available in the trade names of "Asahi Thermal" manufactured by Asahi Carbon Co., Ltd., "HTC#20" manufactured by Nittetsu Co., Ltd., "Sevacarb M.T." manufactued by Sevalco Co., Ltd., "Huber N990" manufactured by Huber Co., Ltd., "Raven MTP" manufactured by Columbian Co., Ltd., and "Thermax P-33". The specific surface area measured by the nitrogen adsorption method of these carbon blacks is 25 m$^2$/g or less and these carbon blacks have scarcely a chain structure. Excessive dispersing power is required to blend carbon black and a binder, and generally it tends to break the structure of carbon black. However, if carbon black and binder are not sufficiently blended, the backing layer is easily peeled apart after coating. But, carbon black corresponding to M.T., F.T. or furnace carbon corresponding to F.T. which has no chain structure or has scarcely chain structure is well blended with a binder and when the carbon is used, the surface electric resistance of a coated layer occurring while dispersing does not increase. These carbon blacks can make a surface of the backing layer properly coarse, and with the combination of the following resins, particles and binder ratio and diphenylmethane diisocyanate, better durability can be obtained. The average particle size of the carbon black is preferably 0.1 to 1 μm, more preferably 0.15 to 0.5 μm.

The binder used in the backing layer of the present invention contains at least 50 wt% of a resin which is conventionally used for a magnetic recording medium, with the resin having a modulus of elasticity, defined in accordance with JIS-K6301, of 150 kg/cm$^2$ or less, preferably 120 kg/cm$^2$ or less. If the binder contains more than 50 wt% of a resin having a modulus of elasticity of more than 150 kg/cm$^2$, scratches on the backing layer readily generate and drop out increases.

Resins having the required value of 150 kg/cm$^2$ or less for the modulus of elasticity can be selected from known thermoplastic resins, thermosetting resins, reactive type resins and the mixture thereof.

In particular, thermoplastic resins having the required value for the modulus of elasticity can be selected from those having a softening temperature of 150° C. or less, an average molecular weight of 10,000 to 200,000, and preferably 20,000 to 140,000 and a degree of polymerization of about 200 to 2,000, and preferably 250 to 1,000 such as a copolymer of vinyl chloride and vinyl acetate, a polyurethane resin, a phenoxy resin, an epoxy resin, a polyester resin, a copolymer of acrylic acid ester and styrene, a copolymer of methacrylic acid ester and acrylonitrile, a copolymer of methacrylic acid ester and styrene, urethane elastomer, nylon and silicon type resin, a copolymer of butadiene and acrylonitrile, a polyamide resin, polyvinyl butyral, cellulose derivatives (cellulose acetate butylate, cellulose diacetate, cellulose triacetate, cellulose propionate), a copolymer of styrene and butadiene, a polyester resin, a copolymer of chlorovinyl ether and acrylic acid ester, an amino resin, various synthetic rubber type thermoplastic resins and the mixture thereof.

Resins having a modulus of elasticity of 150 kg/cm$^2$ or less used in the backing layer of the present invention are used in an amount of about 50 wt% or more and preferably about 50 wt% to 95wt%, per total amount of binder. Commercially available resins which have 100% modulus of 150 kg/cm$^2$ or less are "DN-4805" (100% modulus=50 kg/cm$^2$), "DN-4806" (100 kg/cm$^2$), "DN-4830" (120 kg/cm$^2$), "N2302" (Nippollan N 2302) (25 to 40 kg/cm$^2$) and "N2304" (Nippollan N2304) (15 to 30 Kg/cm$^2$), all of them are a polyurethane manufactured by Nippon Polyurethane Co., Ltd.

The binder used in the backing layer of the present invention also contains a diphenyl methane diisocyanate type hardening agent.

Diphenyl methane diisocyanate type hardening agents used in the backing layer of the present invention include 4,4'-diphenyl methane diisocyanate (hereinafter, referred to as a "MDI"), reaction products of MDI and a polyol, and MDI condensation products such as Biuret type or isocyanurate type condensation products, wherein a polyol has from 2 to 20 carbon atoms. Specific examples of a polyol include glycols such as ethylene glycol, butylene glycol, propylene glycol, 1,4-hexanediol, bishydroxy ethoxybenzene, etc., bifunctional polyols such as an adipate type polyethylene adipate, poly(1,4-butylene adipate), polycaprolactone, polycarbonate, polyoxytetramethylene glycol, etc., and polyfunctional polyols such as glycerin, trimethylol propane, etc.

Biuret type condensation products are obtained by biuret type condensation reaction that a decarboxylation reaction occurs in the presence of water, and isocyanate type condensation products are obtained by a condensation reaction occurring six-membered ring. Accordingly, typical examples of MDI type hardening agents are shown below.

(1) "Simidule 44V20" (Sumitomo Bayer Co., Ltd.)
(2) "Millionate" (Nippon Polyurethane)
(3) "MDI-PH" (Mitsui Nisso Co., Ltd.)
(4) "Millionate MR" (Nippon Polyurethane Co., Ltd.)
  "Millionate MR-100", "Millionate MR-200", "Millionate MR-300", "Millionate MR-400"
(5) "MDI-CR" (Mitsui Nisso Co., Ltd.)
(6) "Millionate MTL" (Nippon Polyurethane Co., Ltd.)

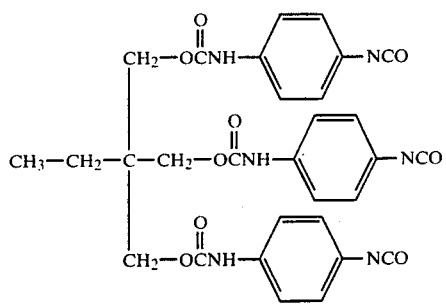
(7)

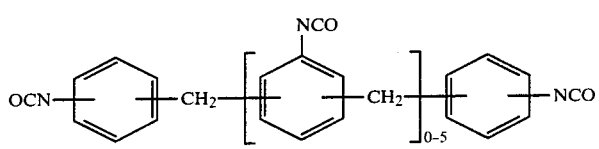
(8)

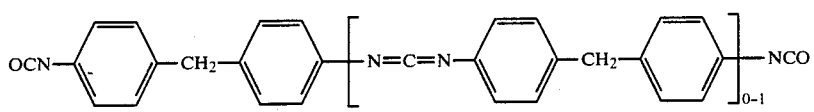
(9)

"Collonate 2014" (Nippon Polyurethane Co., Ltd.) (10)

"Millionate MS-50" (Nippon Polyurethane Co., Ltd.) (11)

"Collonate 2501" (Nippon Polyurethane Co., Ltd.) (12)

The resins having a modulus of elasticity of 150 kg/cm² or less are used in an amount of about 50 wt% or more per the total amount of binder to reduce scratches made on a tape by dust between guide systems, because these resins are considered to act as a lubricant of the dust. At the same time, a diphenyl methane type polyisocyanate as hardening agents which can harden resins quickly is used to make the backing layer tough in an amount of 5 to 40 wt%, and preferably 5 to 30 wt%, based on the total amount of binder.

The binder used in the backing layer of the present invention contains resins other than the above described resins having the required 150 kg/cm² or less value for modulus of elasticity are conventionally known thermoplastic resins, thermosetting resins, reactive type resins or mixtures thereof. The other resins are employed in an amount of 50 wt% or less based on the total weight amount of binder and have a softening temperature of 150° C. or lower and an average molecular weight of 10,000 to 200,000, and preferably 20,000 to 140,000 and a polymerization degree of about 200 to 2,000, and preferably 250 to 1,000. Specific examples are a copolymer of vinyl chloride and vinyl acetate, a copolymer of vinyl chloride and vinylidene chloride, a copolymer of vinyl chloride and acrylonitrile, a copolymer of acrylic acid ester and acrylonitrile, a copolymer of acrylic acid ester and vinylidene chloride, a copolymer of acrylic acid ester and styrene, a copolymer of methacrylic acid ester and acrylonitrile, a copolymer of methacrylic acid ester and vinylidene chloride, a copolymer of methacrylic acid ester and styrene, an urethane elastomer, nylon and silicon type resin, a nitrocellulose and polyamide resin, a polyvinyl fluoride, a copolymer of vinylidene chloride and acrylonitrile, a copolymer of butadiene and acrylonitrile, a polyamide resin, a polyvinyl butyral, cellulose derivatives (cellulose acetate butyrate, cellulose diacetate, cellulose triacetate, cellulose propionate and nitrocellulose), a copolymer of styrene and butadiene, a polyester resin, a copolymer of chlorovinyl ether and acrylic acid ester, an amino resin, various synthetic rubber type thermoplastic resins and the mixture thereof.

Specific examples thereof are disclosed in Japanese Patent Publication Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72 and 27886/72.

In addition to the non-magnetic carbon black particles, the backing layer of the present invention preferably contains fine particles other than carbon black. Examples of such other fine particles which can be used in the backing layer of the present invention includes TiO, $TiO_2$, Talc, $BaSO_4$, $CaCO_3$, graphite, $(CF)_n$, $(BN)_n$, $SiO_2$, $MoS_2$, ZnO, $\alpha\text{-}Fe_2O_3$, $Al_2(SiO_3)_2$, $Al_2O_3$, $CaSiO_3$, Zeolite, $MgCO_3$, $BaCO_3$, $Cr_2O_3$, SiC, silicon nitride, zirconium silicate, $MgSiO_n$, a benzoguanamine resin, CsO, BeO, $(CB)_n$, and $Mg(OH)_2$. Of these, particles whose surface electric resistance is low or particles whose surface electric resistance is high but can be reduced by surface treatment are preferred. Those particles having an average particle size of about 0.01 μm to 3 μm are preferred.

The non-magnetic particles of the present invention comprise 50 to 100 wt% of the above described carbon and 50 to 0 wt% of other non-magnetic particles (other fine particles). Further, the amount of non-magnetic particles to total binder contained in the backing layer is 40 to 300 parts by weight of non-magnetic particles, and preferably 75 to 200 parts by weight of non-magnetic particles, per 100 parts by weight of binder. When the amount of non-magnetic particles exceeds 300 parts by weight of non-magnetic particles, adhesion of the non-magnetic support to the backing layer deteriorates and drop out readily increases after repeated run. When the amount of non-magnetic particles is under 40 parts by weight of non-magnetic particles, satisfactory surface electric resistance of a tape can hardly be kept and noise generated by discharge between the tape and deck head is detected as drop out.

In the present invention, various dispersing agents and lubricants can further be contained.

Dispersing agents which can be used in the backing layer of the present invention include a fatty acid having 12 to 18 carbon atoms ($R_1COOH$, wherein $R_1$ is an alkyl group having 11 to 17 carbon atoms) such as caprylic acid, capric acid, lauric acid, myristic acid, palmitic acid, stearic acid, oleic acid, elaidic acid, linoleic acid, linolenic acid or stearol acid; metal soaps comprise an alkali metal (Li, Na, K) of the fatty acid and an alakli earth metal (Mg, Ca, Ba,), Pb or Cu of the fatty acid; and lecithin.

Lubricating agents which can be used in the backing layer of the present invention include graphite, molybdenum disulfide, tungsten disulfide, fatty acid esters comprise monobasic fatty acid having 12 to 16 carbon atoms and monovalent alcohol having 3 to 12 carbon atoms, fatty acid esters comprise monobasic fatty acid having 17 or more of carbon atoms and monovalent alcohol having 21 to 23 carbon atoms including the number of carbon atoms in the fatty acid, and silicon compounds such as dimethylpolysiloxane or methyl phenyl siloxane.

Classification between dispersing agents and lubricating agents is not clear and there are many compounds which have both of the above described functions.

Solvents which can be used for mixing, kneading and coating the composition for the backing layer in the present invention include ketones such as acetone, methyl ethyl ketone, methyl isobutyl ketone or cyclohexanone; alcohols such as methanol, ethanol, propanol or butanol; esters such as methyl acetate, ethyl acetate, butyl acetate, ethyl lactate, glycol acetate or monoethyl ether; glycol ethers such as ether, glycol dimethyl ether, glycol monoethyl ether or dioxane; tars (aromatic hydrocarbons) such as benzene, toluene or xylene; chlorinated hydrocarbons such as methylene chloride, ethylene chloride, carbon tetrachloride, chloroform, ethylene chlorohydrin or dichlorobenzene and water, in an optional mixing ratio.

For preparing a magnetic recording layer or a backing layer, the components of the respective layer can optionally be combined, or dispersed in an organic solvent to prepare a coating composition which can then be coated on a support.

When a magnetic recording medium is used as a tape, the thickness of the support is about 2.5 to 100 μm, preferably 3 to 40 μm. Materials for the support include polyesters such as polyethylene terephthalate or polyethylene naphthalate, polyolefines such as polypropylene, cellulose derivatives such as cellulose triacetate or cellulose diacetate, vinyl type resins such as polyvinyl chloride, plastics such as polycarbonate, ceramics, glass, and metals such as aluminum or copper.

The components of the coating dispersion (carbon black, binders, solvents and particles) used for preparing the backing layer of the present invention can be dispersed by a ball mill, a pebble mill, a sand grinder, an atomizer, a three roll mill, a high speed impeller dispersing device, or a high speed stone mill.

A suitable method for coating the backing layer on a support includes an air doctor coating method, a blade coating method, an air knife coating method, a squeeze coating method, a dip coating method, a reverse roll coating method, a transfer roll coating method, a gravure coating method, a kiss coating method, a cast coating method, a spray coating method, and a bar coating method. Other coating methods can be used. These coating methods are disclosed in more detail in "Coating Engineering", pages 253 to 277, published by Asakura Shoten on Mar. 20, 1971.

The dry thickness of the backing layer is preferably 1.5 μm to 2.5 μm.

The present invention is further illustrated in more detail by the following Examples. It will be understood by those skilled in this art that materials, quantities and operation orders can be changed so long as the gist of the present invention is not essentially changed. Accordingly the present invention should not be limited to the following Examples. In the Examples, all parts are by weight.

EXAMPLE 1

The following composition was introduced into a ball mill, mixed, kneaded sufficiently, and 20 parts of "Desmodule L-75" of TDI (tolylenediisocyanate) type hardening agents (a trade name of a polyisocyanate compound manufactured by Bayer Co., Ltd.) were added thereto, and were mixed and dispersed homogeneously to prepare a magnetic coating composition.

| | |
|---|---|
| Co-containing $\gamma$-$Fe_2O_3$ | 300 parts |
| (Coercive force of powder: HC = 800 Oe) | |
| Copolymer of vinyl chloride/vinyl acetate/vinyl alcohol (87/5/8) | 30 parts |
| (Polymerization degree: about 400) | |
| Epoxy resin | 10 parts |
| (Epoxy group content: 0.56) | |
| Carbon black | 5 parts |
| (Average particle size: 0.09 μm) | |
| Lecithin | 3 parts |
| Copper oleate | 1 part |
| Octyl laurate | 3 parts |
| Lauric acid | 4.5 parts |
| Butyl acetate | 330 parts |
| Methyl isobutyl ketone | 660 parts |

The resulting magnetic coating composition was coated on a polyester support film (thickness: 10 μm) and dried to form a magnetic layer.

The following composition for a backing layer was prepared in a ball mill and was coated on the surface of the polyester support opposite to the magnetic layer in a dry thickness of 2 μm and dried.

| | |
|---|---|
| Carbon black ("Raven MTP", Average particle size: 0.25 μm) | 100 parts |
| Talc (Bentonite) | 50 parts |
| Graphite | 50 parts |
| "Nippollan-2304" manufactured by Nippon Polyurethane Co., Ltd. | 60 parts |
| Saran resin (Dow-Chemical Co., Ltd.) | 30 parts |
| "Collonate 2014" | 10 parts |
| Methyl ethyl ketone | 450 parts |
| Cyclohexanone | 50 parts |

The resulting tape was subjected to calendering method using a roll having mirrored surface and was slit a width of ½ inch to obtain a Sample No. 1.

EXAMPLE 2

The same procedure as in Example 1 was repeated to prepare a magnetic layer on a polyester support film.

Then a coating composition having the following formulation for a backing layer was prepared in a ball mill and was coated on the surface of the polyester support film (thickness: 10 μm) opposite to the magnetic layer in a dry thickness of 2 μm and was dried.

| | |
|---|---|
| Carbon black ("Raven MTP", Average particle size: 0.250 μm) | 200 parts |
| Talc (Bentonite) | 50 parts |
| Graphite | 50 parts |
| "Nippollan-2304" manufactured by Nippon Polyurethane Co., Ltd. | 60 parts |
| Saran resin (Dow-Chemical Co., Ltd.) | 30 parts |
| "Collonate 2014" | 10 parts |
| Methyl ethyl ketone | 450 parts |
| Cyclohexanone | 50 parts |

The resulting tape was treated in the same manner as in Example 1 and was slit to ½ inch to prepare Sample No. 2.

EXAMPLE 3

The same procedure as in Example 1 was repeated to prepare a magnetic layer on a polyester support film. Then a coating composition having the following formulation for a backing layer was prepared in a ball mill and was coated on the surface of the polyester support film (thickness: 10 μm) opposite to the magnetic layer in a dry thickness of 2 μm.

| | |
|---|---|
| Carbon black ("Raven MTP", Average particle size: 0.250 μm) | 50 parts |
| "Nippollan-2304" manufactured by Nippon Polyurethane Co., Ltd. | 60 parts |
| Phenoxy resin ("PKHH", a trade name manufactured by Union Carbide Co., Ltd.) | 30 parts |
| "Collonate 2014" | 10 parts |
| Methyl ethyl ketone | 450 parts |
| Cyclohexanone | 50 parts |

The resulting tape was slit to a width of ½ inch to prepare a Sample No. 3.

COMPARATIVE EXAMPLE 1

The same procedure as in Example 1 was repeated except that in the composition for the backing layer, 100 parts of carbon black "Asahi Carbon #50" (average particle size: 0.095 μm) were used instead of carbon "Raven MTP" to prepare a Sample No. 4.

COMPARATIVE EXAMPLE 2

The same procedure as in Example 1 was repeated to prepare a Sample No. 5 except that in the composition for the backing layer 10 parts of "Desmodule L-75" of isocyanate were used instead of "Collonate 2014". "Desmodule L-75" is not a diphenyl methane diisocyanate type hardening agent, but is an isocyanate hardening agent.

COMPARATIVE EXAMPLE 3

The same procedure as in Example 2 was repeated to prepare a Sample No. 6 except that in the composition for the backing layer 10 parts of "Desmodule L-75" were used instead of "Collonate 2014".

COMPARATIVE EXAMPLE 4

The same procedure as in Example 3 was repeated to prepare a magnetic layer on a polyester support film. A coating composition for a backing layer having the same formulation as in Example 3 was prepared, except that 10 parts of "Desmodule L-75" were used instead of "Collonate 2014", and was coated on the polyester support film (thickness: 10 μm) in the same manner as in Example 2 to prepare a Sample No. 7.

COMPARATIVE EXAMPLE 5

The same procedure as in Example 1 was repeated to prepare a magnetic layer on a polyester support film (thickness: 10 μm). Then a coating composition for a backing layer having the following formulation was prepared in a ball mill and was coated on the surface of the non-magnetic polyester support film opposite to the magnetic layer in a dry thickness of 2 μm and dried.

| | |
|---|---|
| Carbon black ("Raven MTP", Average particle size: 0.250 μm) | 200 parts |
| Talc (Bentonite) | 100 parts |
| Graphite | 100 parts |
| "Nippollan-2304" manufactured by Nippon Polyurethane Co., Ltd. | 60 parts |
| Saran resin (Dow-Chemical Co., Ltd.) | 30 parts |
| "Collonate 2014" | 10 parts |
| Methyl ethyl ketone | 450 parts |
| Cyclohexanone | 50 parts |

A sample No. 8 was prepared in the same manner as in Example 1.

COMPARATIVE EXAMPLE 6

The same procedure as in Example 1 was repeated to prepare a magnetic layer on a polyester support film. Then a coating composition for a backing layer having the same formulation as in Example 3, except that 30 parts of carbon black "Raven MTP", was prepared and a Sample No. 9 was prepared in the same manner as in Example 3.

Regarding these sample tapes, RF output, scratches on the backing layer and the number of drop out after repeated run for 1000 passes were measured and the results are shown in Table 1.

RF output is shown by the relative dB when recording and reproducing was conducted at 4 MHz.

Scratches formed on the backing layer were observed after sample tapes of 5 minutes length were repeated "play-rewind" for 1000 passes. The scratches were evaluated by the following evaluation of three grades.

A: No scratches were observed.
B: 0 to 5 scratches were observed.
C: 6 or more scratches were observed.

The number of drop out was measured after sample tapes were repeated run for 1000 passes. The number of drop out is shown by the number of occurrences of drop out for 15 μsec or more measured by a drop out counter per 5 minutes where the reproducing output level decreased by 16 dB or more.

TABLE 1

| Sample No. | Carbon | Isocyanate | Mixing Ratio of Powder/Binder | RF Output | Scratches on Backing Layer | Number of Drop out |
|---|---|---|---|---|---|---|
| 1 | Raven MTP (Invention) | Collonate 2014 | 200/100 | 0 dB (standard) | A | 55 |
| 2 | Raven MTP (Invention) | Collonate 2014 | 300/100 | −0.1 | A | 52 |
| 3 | Raven MTP (Invention) | Collonate 2014 | 50/100 | +0.3 | A | 36 |
| 4 | Asahi Carbon #50 (Comparison) | Collonate 2014 | 200/100 | +0.2 | C | 870 |
| 5 | Raven MTP #50 (Comparison) | Desmodule L-75 | 200/100 | −0.2 | A | 1000< |
| 6 | Raven MTP #50 (Comparison) | Desmodule L-75 | 300/100 | +0.2 | B | 1000< |
| 7 | Raven MTP #50 (Comparison) | Desmodule L-75 | 50/100 | −0.1 | B | 1000< |
| 8 | Raven MTP #50 (Comparison) | Collonate 2014 | 400/100 | −0.7 | B | 1000< |
| 9 | Raven MTP #50 (Comparison) | Collonate 2014 | 30/100 | +0.3 | A | 900* |

*The backing layer was peeled apart at the calendering treatment.

It is apparent from the results in Table 1 that sample tapes (Nos. 1 to 3) of the present invention containing particles and binders in a ratio of 300/100 to 40/100 and "Collonate 2014" in the combination use of carbon "Leben MTP" and "Nippollan 2304" exhibits remarkably excellent results in the drop out increase test.

EXAMPLE 4

The following composition was introduced into a ball mill and mixed and kneaded sufficiently, then 40 parts of "Desmodule L-75" (a trade name of a polyisocyanate compound manufactured by Bayer Co., Ltd.) were added thereto and were mixed and dispersed homogeneously to prepare a magnetic coating composition.

| | |
|---|---|
| Co-containing γ-Fe$_2$O$_3$ (Coercive force of powder: HC = 600 Oe) | 300 parts |
| Vinyl chloride/vinyl acetate compound (86/13) ("VMCH" a trade name, manufactured by Union Carbide Co., Ltd. | 30 parts |
| "Nippollan N 2304" (manufactured by Nippon Polyurethane CO., Ltd.) | 15 parts |
| Carbon black (Average particle size: 0.017 μm) | 20 parts |
| Lecithin | 3 parts |
| Oleic acid | 5 parts |
| Octyl laurate | 3 parts |
| Lauric acid | 3 parts |
| Butyl acetate | 330 parts |
| Methyl ethyl ketone | 660 parts |

The resulting magnetic coating composition was coated on a polyethylene terephthalate support (thickness: 20 μm) and dried to form a magnetic layer. Then, the following composition was prepared in a ball mill, and 20 parts of "Collonate 2061" (a trade name of polyisocyanate manufactured by Nippon Polyurethane Co., Ltd.) were added thereto and were mixed and dispersed homogeneously to prepare a backing layer composition. The backing layer composition was coated on the surface of the polyester support opposite to the magnetic layer in a dry thickness of 2 μm and dried.

| | |
|---|---|
| Carbon black ("Raven MTP", Average particle size: 0.250 μm) | 200 parts |
| Cr$_2$O$_3$ (Average particle size: 0.7 μm) | 1 part |
| "Nippollan 2304" (manufactured by Nippon Polyurethane Co., Ltd.) | 80 parts |
| Saran resin (Dow-Chemical Co., Ltd.) | 40 parts |
| Copper oleate | 1 part |
| Stearic acid | 0.5 part |
| Methyl ethyl ketone | 450 parts |
| Cyclohexanone | 50 parts |

The resulting tape was subjected to calendering method using a roll having mirrored surface and was slit to a width of 1 inch to prepare a Sample No. 10.

EXAMPLE 5

The same procedure as in Example 4 was repeated to prepare a Sample No. 11 except that the thickness of the backing layer was 1.5 μm.

EXAMPLE 6

The same procedure as in Example 4 was repeated to prepare a Sample No. 12 except that the thickness of the backing layer was 2.5 μm.

EXAMPLE 7

"Raven MTP" was dispersed in cyclohexanol and the mixture was centrifused at 3500 rpm for 5 times to prepare carbon black having an average particle size of 0.40 μm. The same composition for the backing layer as in Example 4 was prepared except that 200 parts of the above prepared carbon black were used instead of the 200 parts of carbon black employed in Example 4. Except for the difference in carbon black in the backing layer composition, the same procedure as in Example 4 was repeated to prepare a sample, which was identified as Sample No. 13.

COMPARATIVE EXAMPLE 7

The same procedure as in Example 4 was repeated to prepare a Sample No. 14 except that the thickness of the backing layer was 1.0 μm.

COMPARATIVE EXAMPLE 8

The same procedure as in Example 4 was repeated to prepare a Sample No. 15 except that the thickness of the backing layer was 3.0 μm.

COMPARATIVE EXAMPLE 9

The same procedure as in Example 4 was repeated except that "Pandex T5070" (a polyurethane manufactured by Dai-Nippon Ink & Chemicals, Inc.) (THF solvent, modulus of elasticity: 200 kg/cm² or more) was used in the backing layer composition as a binder component instead of "Nippollan 2304". The resulting tape sample was identified as Sample No. 16.

COMPARATIVE EXAMPLE 10

The same procedure as in Example 4 was repeated except that nitrocellulose (nitration degree: 11.1%, a molecular weight: 50,000, modulus of elasticity: 200 kg/cm² or more) was used in the backing layer composition instead of "Nippollan 2304". The resulting tape sample was identified as Sample No. 17.

Regarding these sample tapes, RF output, scratches formed on the backing layer and the number of drop out after repeated run for 500 passes were measured and the results are shown in Table 2.

RF output and scratches formed on the backing layer were evaluated in the same manner as in Table 1. The number of drop out is shown by the number of occurrences of drop out for 5 μsec or more measured by a drop out counter per 5 mins. where the reproducing output level decreased by 16 dB or more.

TABLE 2

| Sample No. | Carbon | Main Binder | P/B | Thickness (μm) | RF Output (dB) | Scratches | Number of Drop Out |
| --- | --- | --- | --- | --- | --- | --- | --- |
| 10 | Raven MTP (0.25 μm) (Invention) | N-2304 | 143/100 | 2.0 | 0 (standard) | A | 67 |
| 11 | Raven MTP (0.25 μm) (Invention) | N-2304 | 143/100 | 1.5 | 0 | A | 75 |
| 12 | Raven MTP (0.25 μm) (Invention) | N-2304 | 143/100 | 2.5 | −0.2 | A | 70 |
| 13 | Raven MTP (0.40 μm) (Invention) | N-2304 | 143/100 | 2.0 | −0.1 | A | 28 |
| 14 | Raven MTP (0.40 μm) (Comparison) | N-2304 | 143/100 | 1.0 | +0.2 | C | 180 |
| 15 | Raven MTP (0.40 μm) (Comparison) | N-2304 | 143/100 | 3.0 | −1.4 | A | 43 |
| 16 | Raven MTP (0.25 μm) | T-5070 | 143/100 | 3.0 | +0.1 | C | >1000 |
| 17 | Raven MTP (0.25 μm) | Nitrocellulose | 143/100 | 3.0 | −0.3 | B | >1000 |

It is clear from the results in Table 2 that sample tapes (Nos. 10 to 15) of the present invention exhibits remarkably excellent results in the drop out test, compared with those sample tapes using T-5070 with a high modulus of elasticity and nitrocellulose as a binder, and particularly sample tapes (Sample Nos. 10 to 13) having a thickness of the backing layer of 1.5 to 2.5 μm exhibited excellent results in the scratch and RF output tests.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having a magnetic layer and a backing layer which is provided on the surface of the support opposite to the magnetic layer, the backing layer containing (a) non-magnetic particles comprising carbon black having an average particle diameter of 0.15 to 1.0 μm, (b) a binder comprising (i) a resin having 150 kg/cm² or less of modulus of elasticity in an amount of at least 50 wt% based on the total amount of binder, and (ii) a diphenyl methane diisocyanage hardening agent, with the amount of non-magnetic particles to total binder contained in the backing layer being 40 to 300 parts by weight of non-magnetic particles per 100 parts by weight of binder, wherein the diphenyl methane diisocyanate harding agent is present in an amount of 5 to 40 wt% based on the total amount of binder.

2. A magnetic recording medium as claimed in claim 1 wherein the backing layer has a dry thickness of 1.5 μm to 2.5 μm.

3. The magnetic recording medium as claimed in claim 1, wherein the resin has a modulus of elasticity of 120 kg/cm² or less.

4. The magnetic recording medium as claimed in claim 2, wherein the resin is present in an amount of 50 to 95 wt% based on the total amount of binder.

5. The magnetic recording medium as claimed in claim 1, wherein the average size of the carbon black is 0.15 to 0.5 μm.

6. The magnetic recording medium as claimed in claim 1, wherein the non-magnetic particles comprise 50 to 100 wt% of the carbon black and 50 to 0 wt% of other non-magnetic particles.

7. The magnetic recording medium as claimed in claim 1, wherein the diphenyl methane diisocyanate hardening agent is 4,4'-diphenyl methane diisocyanate (MDI), reaction products of MDI and a polyol, or MDI condensation products.

8. The magnetic recording medium as claimed in claim 1, wherein the diphenyl methane diisocyanate hardening agent is present in an amount of 5 to 30 wt% based on the total amount of binder.

* * * * *